(No Model.)

S. FRASE & J. H. CAMERON.
PULVERIZER.

No. 364,239. Patented June 7, 1887.

WITNESSES:
Harry Frease
Joseph Frease

INVENTORS
Simon Frase &
John H. Cameron
BY
Fred W. Bond
ATTORNEY

UNITED STATES PATENT OFFICE.

SIMON FRASE AND JOHN H. CAMERON, OF NORTH INDUSTRY, OHIO.

PULVERIZER.

SPECIFICATION forming part of Letters Patent No. 364,239, dated June 7, 1887.

Application filed September 30, 1886. Serial No. 215,025. (No model.)

*To all whom it may concern:*

Be it known that we, SIMON FRASE and JOHN H. CAMERON, citizens of the United States, residing at North Industry, in the county of Stark and State of Ohio, have invented certain new and useful Improvements in Pulverizers; and we do hereby declare that the following is a full, clear, and exact description of the same, reference being had to the annexed drawings, making a part of this specification, and to the letters and figures of reference marked thereon, in which—

Figure 1:
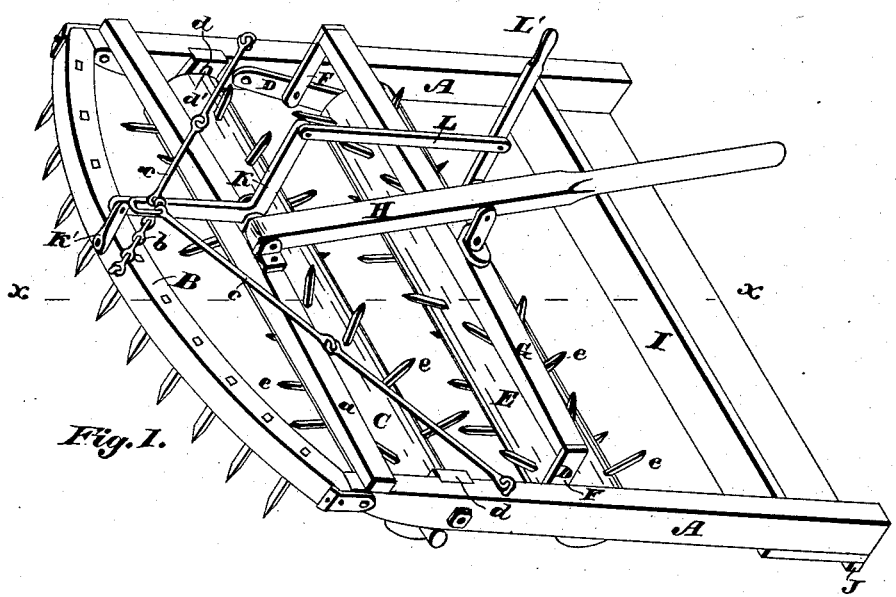
Figure 2:
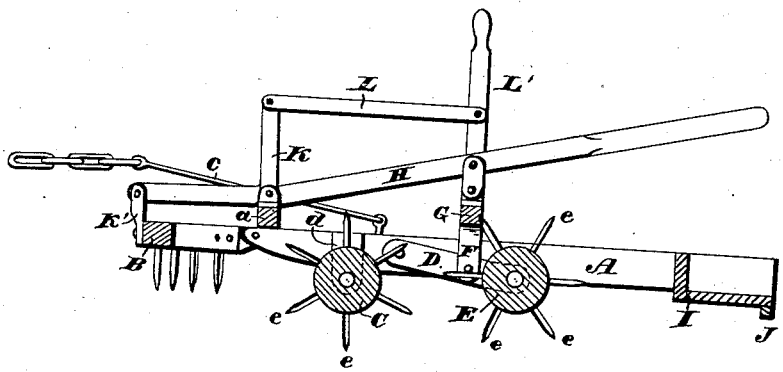

Figure 1 is a perspective view. Fig. 2 is a sectional view on line $x\,x$, Fig. 1.

The present invention has relation to pulverizers; and its nature consists in the different parts and combination of parts, hereinafter described, and particularly pointed out in the claims.

Similar letters of reference indicate corresponding parts in both the figures of the drawings.

In the accompanying drawings, A A represent the side rails or bars, said side rails or bars being securely held together by means of the cross-bars $a\,a$. Said side bars or rails and the cross-bars constitute the frame, which may be of any desired size.

To the front or forward end of the frame proper is attached the bar B, said bar being pivoted to the frame, substantially as shown in the drawings, and is so arranged that it will follow the surface of the ground in case the ground is uneven. For the purpose of preventing the bar B from turning under the frame, the chains $b\,b$ are attached to said bar B and to the draft-rods $c\,c$, these chains being of sufficient length to permit the bar B to have the desired amount of play or movement.

To the front or forward portion of the frame proper is attached the roller C, this roller being held in proper position by means of the bearings $d$. The top or upper ends of the bearings $d$ are provided with the slots $d'$, which are for the passage of suitable clamping-bolts, and at the same permitting the bearings to be adjusted up or down, thereby adjusting the roller C to or from the frame proper. For the purpose of rigidly holding the bearings $d$ in proper position laterally, they may be set into the side rails, A A, substantially as shown in the drawings.

To the side rails or bars, A A, are attached the arms D, these arms being located substantially as shown. The rear or lower portions of these arms D are provided with suitable bearings for the roller E. The arms D are so attached to the side rails or bars, A A, that they can turn at the point of attachment, thereby permitting the roller E to follow the surface of the ground. To the arms D are attached the arms F, said arms being located substantially as shown. To the top or upper ends of the arms F is attached the bar G, and to the center of the bar G is attached the lever H, the front or forward end of this lever being pivotally attached to the front or forward cross-bar $a$, or its equivalent.

To the rear ends of the side rails or bars, A A, is securely attached the cross-bar I, said cross-bar being substantially of the form shown in the drawings. The bottom or under side of the cross-bar I is provided with the rib J, which is located substantially as shown, and is for the purpose hereinafter described. The teeth $e$ are attached to the rollers C and E in any convenient and well-known manner, and are arranged spirally on the peripheries of the rollers C and E, and are so arranged for the purpose of more effectually pulverizing the ground.

It will be seen that, by placing the cross-bar I in the rear of the rollers C and E, any clods that are not thoroughly pulverized will be by means of said cross-bar I, and for the purpose of preventing clods or lumps from passing under the cross-bar I the rib J is provided, which will prevent the escape of clods or lumps. It will be understood that the cross-bar I is held to the ground by means of suitable weights. It will also be understood that, for the purpose of providing a sufficient amount of pressure upon the roller E, a weight may be attached to the free end of the lever H.

In case it is desired, the rollers C and E may be properly covered with a suitable box or other frame-work. The teeth in the pivoted bar B may be substantially of the form shown in the drawings, or they may be of any other form desired, and, if desired, different bars may be attached provided with different kinds of teeth, owing to the condition of the ground to be pulverized. To the front or forward portion of the frame is pivotally attached the L- shaped lever K, and to this lever K is attached the bar or connecting-rod K'. To the bottom or lower end of said rod K' is attached the bar B. To the top or upper end of the L-shaped lever K is attached the rod L, the rear end of said rod L being attached to the operating-lever L'. It will be seen that, by means of the operating-lever L', the bar B can be elevated for the purpose of clearing any obstructions. It will be understood that the operating-lever L' may be attached to any desired point of the frame.

Having now fully described our invention, what we claim, and desire to secure by Letters Patent, is—

1. The combination of the side rails, A A, provided with the bearings $d$, the arms D, pivotally attached to the side rails, A A, the arms F, attached to the arms D, the lever H, and the cross-bar G, substantially as and for the purpose specified.

2. The combination of the rollers C and E, provided with teeth $e$, the pivoted arms D, carrying the roller E, and the cross-bar I, provided with the rib J, substantially as and for the purpose specified.

3. The combination of the rollers C and E, the arms D, the bearings $d$, provided with the slots $d'$, and the cross-bar I, substantially as and for the purpose specified.

In testimony that we claim the above we have hereunto subscribed our names in the presence of two witnesses.

SIMON FRASE.
JOHN H. CAMERON.

Witnesses:
LORIN C. WISE,
FRED W. BOND.